Nov. 28, 1967  A. B. RYAN  3,354,525
GEAR CUTTING TOOLS AND METHOD OF SHARPENING SAME
Filed June 28, 1965
3 Sheets-Sheet 1
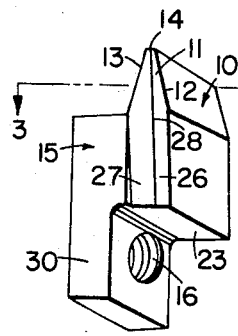
FIG. 1
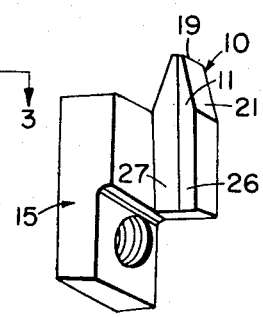
FIG. 2
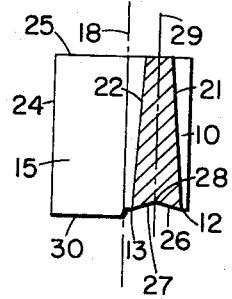
FIG. 3
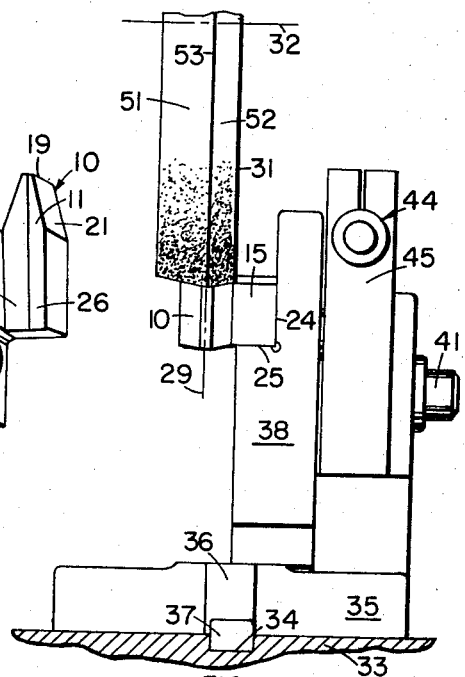
FIG. 4
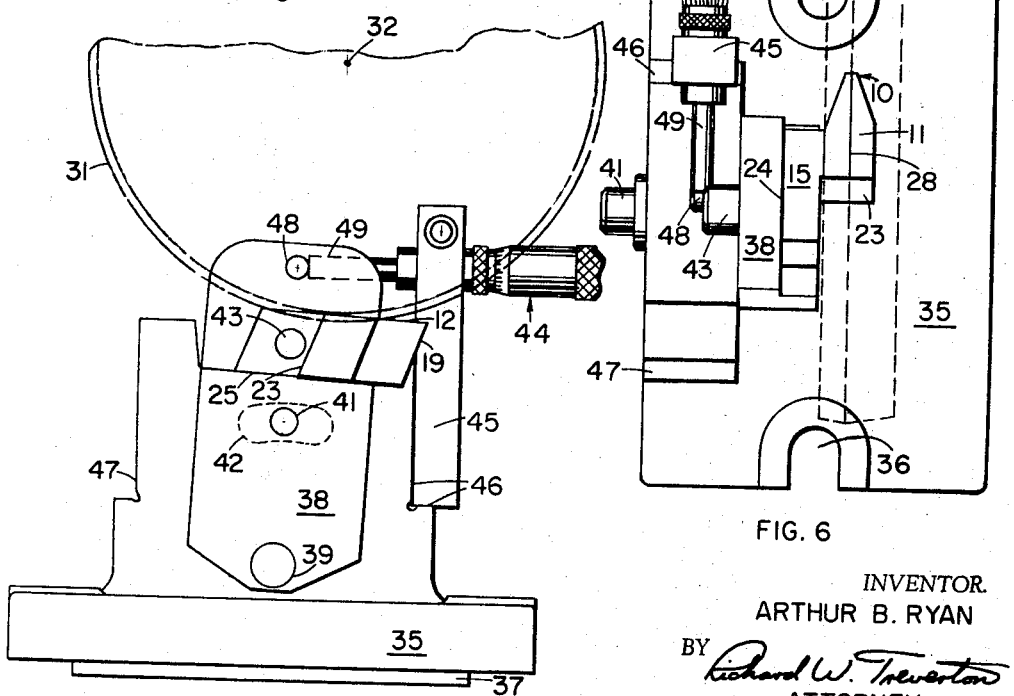
FIG. 5
FIG. 6
INVENTOR.
ARTHUR B. RYAN
BY Richard W. Treverton
ATTORNEY

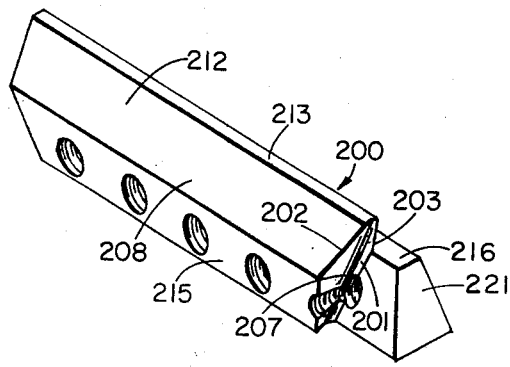
FIG. 12
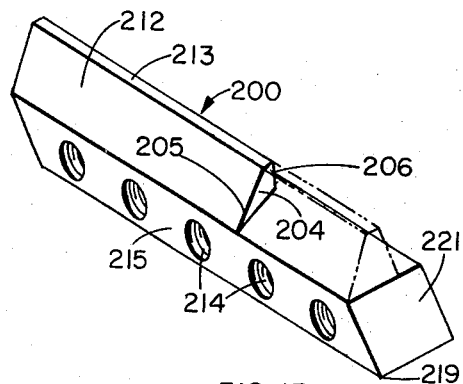
FIG. 13
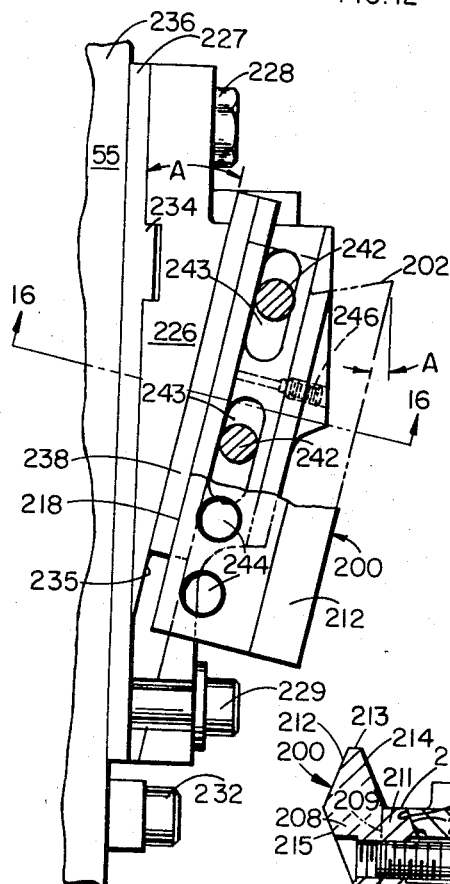
FIG. 15
FIG. 16
FIG. 14

United States Patent Office 3,354,525
Patented Nov. 28, 1967

3,354,525
GEAR CUTTING TOOLS AND METHOD OF
SHARPENING SAME
Arthur B. Ryan, Victor, N.Y., assignor to The Gleason
Works, Rochester, N.Y., a corporation of New York
Filed June 28, 1965, Ser. No. 470,326
19 Claims. (Cl. 29—95)

ABSTRACT OF THE DISCLOSURE

A gear cutting tool of prismatic form has a cutting position and a shank portion that are disposed on opposite sides of and joined together along a real or imaginary juncture plane that is parallel to the prism lateral edges. The cutting portion has adjoining tip and opposite side prism lateral faces on which cutting edges are formed by a transverse sharpening face of the tool. This face is trough shaped, with the bottom of its trough lying in a plane which bisects the angle between the opposite side prism lateral faces, so that both side cutting edges are acute. The bisector plane is parallel to the juncture plane so that a profiled grinding wheel, positioned with its axis perpendicular to these planes, can sharpen the tool by grinding back the trough shaped face while leaving intact the shank portion of the tool.

---

This is a continuation in part of application Ser. No. 420,950, filed Dec. 24, 1964, now abandoned. The invention relates to gear cutting tools, especially tools for cutting straight and skew bevel gears, and to a method of sharpening such tools.

Tools of this kind are usually mounted on oppositely reciprocating tool slides for alternately cutting the opposite sides of the same gear tooth. After each tooth is cut the gear is indexed to bring the next tooth into cutting position. During the cutting of the first tooth in a solid gear blank, both sides of both tools must cut. In cutting succeeding teeth, except the last tooth, one tool continues to cut on both sides, the other tool only on one side. In cutting the last tooth, both tools cut on one side only.

Cutting action is made easier and accuracy is improved when both side cutting edges of the tool are sharpened with side rake, to provide acute cutting edges. To accomplish this the front or cutting faces of the tools have sometimes been ground concavely. Since the opposite side cutting edges are inclined to each other the concavity has been produced by a conical grinding wheel of such cone angle and so positioned that the side cutting edges coincide with cone elements of the wheel. However except for coarse pitch gears, the point width of the tool, i.e. the distance between the side cutting edges at the tip of the tool, is quite small, requiring a conical grinding wheel too small in diameter to be practical for general use. Moreover, sharpening of the tools with the small conical wheels has to be effected by plunge feed which often leaves a rough surface finish, and accurate location of the cutting edges has required a high degree of skill and great care on the part of the operator to avoid burning of the surface being ground. Reduction in diameter of the grinding wheel, by repeated redressing thereof, increases the difficulty and lessens the practicability of sharpening tools with such a concavity.

The object of the present invention is a tool design applicable to tools for gears of either fine or coarse pitch, which will enable sharpening with a grinding wheel of relatively large diameter in a facile and routine manner, and which will produce a smooth finish without burning.

A further object of the invention is a gear cutting tool whose front or cutting face has relatively inclined substantially plane sections, forming a trough between the opposite side edges of the face, so that both of these edges are acute. A still further object is a gear cutting tool, and a method of sharpening, in which a grinding wheel, or equivalent dressing tool, produces the trough by presenting to the gear cutting tool adjoining oppositely tapering conical surfaces, in such manner that the circle of intersection of said surfaces lies in a plane which approximately bisects the angle between the side cutting edges.

Yet another object is a gear cutting tool whose shank, for connection to the tool slide of the gear cutting machine, is offset laterally from the front cutting face, to prevent cutting away of the shank during the sharpening operation.

The foregoing and other objects and advantages of the invention will appear from the following description made with reference to the accompanying drawings, wherein:

FIGS. 1 and 2 are perspective views of the gear cutting tool respectively in its original condition and after being resharpened a number of times;

FIG. 3 is a sectional view through the tool, approximately in plane 3—3 of FIG. 1;

FIGS. 4, 5 and 6 are respectively end, side and top views of a fixture for supporting the tool for sharpening in a grinding machine;

FIGS. 12 and 13 are isometric views, similar to FIG. 1, of a modified cutting tool;

Figure 7:
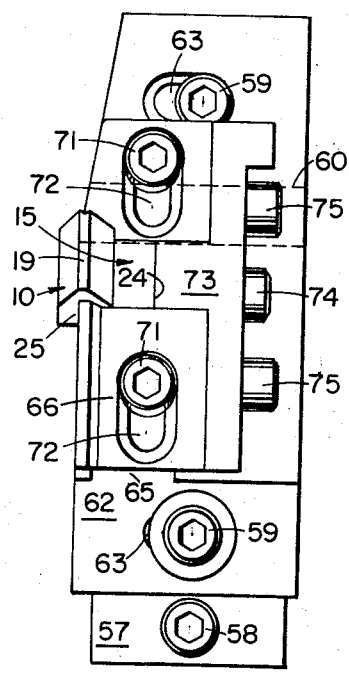
FIGS. 7 and 8 are respectively front and side views of the tool holder of a gear cutting machine, with the tool of the present invention mounted therein.
Figure 8:
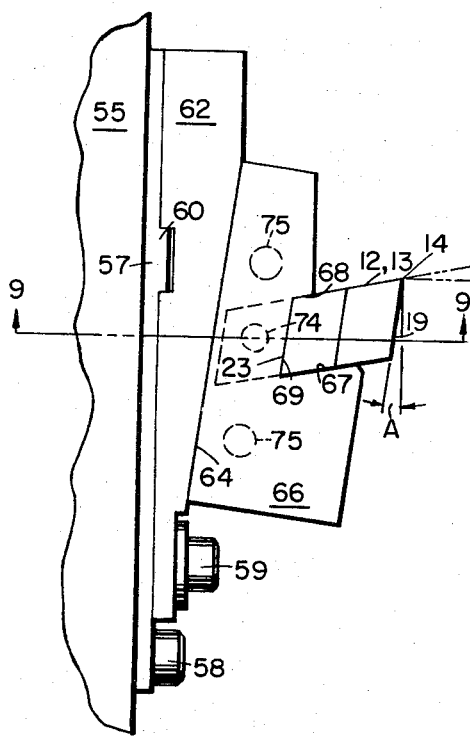

FIGS. 14 and 15 are respectively front and side views, similar to FIGS. 7 and 8, of a holder for the tools shown in FIGS. 12 and 13; and, FIG. 16 is a section in plane 16—16 of FIGS. 14 and 15.

Referring to FIGS. 1 and 2, the gear cutting tool is of prismatic form and has a cutting portion 10 whose front or cutting face 11, sometimes referred to herein as the sharpening face, has relatively inclined opposite side cutting edges 12 and 13 for cutting the sides of the tooth slot of a gear, and a tip cutting edge 14 for cutting the bottom of the slot. The tool has an integral shank portion 15 by which it is secured to a tool holder on the tool slide of a gear cutting machine, preferably in the manner shown in FIGS. 7 to 9, the shank for the purpose of connection to the holder having a screw threaded bore 16. The shank 15 is offset laterally from the cutting portion 10 to permit sharpening of the front face 11 by a grinding wheel 31, FIGS. 4 to 6, or functionally equivalent sharpening tool, without cutting away the shank. As shown in FIG. 2 the shank remains intact after the cutting portion has been greatly shortened by repeated sharpening by regrinding of the front face.

If desired the cutting portion 10 and the shank portion 15 may be made of separate pieces welded or otherwise integrally joined in the plane 18 of FIG. 3, preferably before finish grinding of the top face 19, the cutting side surfaces 21 and 22 and bottom mounting surface 23 of the cutting portion. In such case the cutting portion may advantageously be made of high speed tool steel and the shank portion of a somewhat softer and less expensive steel. As shown, the juncture plane 18, whether real or imaginary, is parallel to the prism lateral edges of the tool, i.e. the parallel edges constituting the junctures of the prism lateral faces.

In any case the prism lateral faces 19 and 21 to 23 are accurately related to side and back plane mounting surfaces constituted by prism lateral faces 24 and 25. Surface 24 is parallel to plane 18 and perpendicular to surface 25; surfaces 19 and 23 are parallel and preferably inclined to surface 25 at substantially less than a right angle, at seventy-two degrees in illustrated embodiments. Cutting side faces 21 and 22 are so related that the top face 19 is of constant width from front to back of the tool, and that the side edges of the top face are parallel to mounting face 24. Front face 30 of the shank is parallel to back mounting face 25.

In order that both side cutting edges 12 and 13 may be acute, the front face 11 is made of trough form, V-shaped in cross-section, by comprising two oppositely inclined substantially plane surfaces 26 and 27 whose line of intersection, 28, constitutes the bottom of the trough. This line lies in a plane 29, FIG. 3, which is parallel to surface 24 and at least approximately bisects the angle between the side cutting edges 12 and 13.

The tool is conveniently sharpened on a conventional surface grinder with the aid of a tool-holding fixture of the kind shown in FIGS. 4 to 6. The grinder may have its grinding wheel, 31, rotatable about horizontal axis 32 and a work-supporting slide 33 reciprocable relative to the wheel in a direction parallel to the plane of rotation of the wheel. A keyway 34 in the slide also extends in this direction. As is conventional the grinding machine has means (not shown) for adjusting the wheel 31 vertically and also axially relative to the slide.

The tool-holding fixture comprises a bracket 35 adapted to be secured to slide 33 by screws (not shown) engaged in recesses 36 and a key 37 fitting keyway 34. The fixture further comprises a tool mounting block 38 pivoted to the bracket by a pin 39 and secured by a headed screw 41 that extends through an arcuate slot 42 in the bracket and is screw threaded to the block. A recess is provided in the block for seating the side and back tool mounting faces 24 and 25. The tool is secured in this recess by a headed screw 43 that extends through the block and is screw-threaded into bore 16 in the tool shank. For setting the position of block 38 about pivot 39 prior to tightening of screw 41, a micrometer gage 44 is employed. The barrel of the gage is secured to a gage arm 45 which, during setting of the block, is held seated in either a recess 46 or a recess 47 in bracket 35, depending upon whether the tool being sharpened is of right hand or left hand. A pin 48 secured to the block is adapted for abutment with the spindle 49 of the micrometer. By adjustment of the block the intersection line 28 in the cutting face 11 may be variously inclined to the back mounting face 25 of the tool. The inclination selected will ordinarily be that which causes side cutting edge 12 to be parallel to back mounting face 25. In the usual case where the cutting side faces 21 and 22 of the tool are equally inclined to plane 29, the side cutting edge 13 will then also be parallel to face 25. However this is not necessary since the edge 13 does not produce a finished gear tooth surface as does the edge 12.

The wheel 31 is dressed to provide thereon opposed conical surfaces 51 and 52 which intersect along circle 53, and, after suitable axial adjustment of the wheel to bring the circle into the plane 29 desired for intersection line 28, grinding of tool face 11 is effected by horizontal relative reciprocation of the rotating wheel and slide 33, during which the wheel is fed downwardly, in FIG. 4, to remove from face 11 the amount of stock necessary to sharpen edges 12, 13 and 14. Coolant is preferably applied during the grinding operation, and this, together with the relative reciprocation, avoids burning and produces a surface finish in the desired quality.

Figure 9:
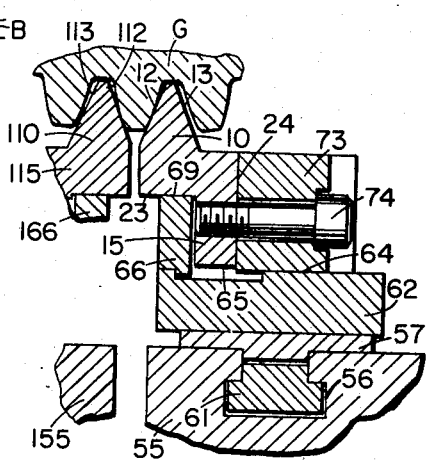
FIG. 9 is a section in plane 9—9 of FIG. 8.

FIGS. 7 to 9 illustrate a preferred tool holder for mounting the tool on a tool slide 55 of a gear cutting machine. The slide has on its face a T-slot 56 which extends in the direction in which the slide reciprocates (vertically in FIGS. 7 and 8), and the holder includes a tool block key 57 which projects into this slot. It is secured to the slide by headed screws 58 and 59 threaded into a strap 61 in the T-slot. Screws 59 also secure to the slide a tool block guide 62 which is adjustable on key 57 in a direction transverse of the T-slot, determined by the engagement of tongue 60 of the key in a groove in the guide. Such adjustment is permitted by the provision in the guide of elongated openings 63 for screws 59.

The outer face 64 of guide 62 is inclined and has therein a longitudinal guide groove 65 receiving an interfitting key portion of a tool seating block 66. The central portion of this block is notched to receive the shank 15 of the tool, and to provide plane surfaces 67 and 68 for contact respectively with back and front faces 25 and 30 of the tool, and plane surface 69 for seating bottom surface 23 of the tool. Headed screws 71 perpendicular to surface 64 and extending through elongated openings 72 in seating block 66 secure the latter to guide block 62, into which the screws are threaded. Surfaces 67 and 68 of block 66 and surface 64 of guide 62 also contact plane surfaces of a generally T-shaped tool clamping bracket 73. This bracket, which is in effect a part of the tool seating block 66, seats side surface 24 of the tool shank. A headed screw 74 threaded into bore 16 secures the tool to the bracket. Similar screws 75 secure the bracket to block 66.

By adjustment of seating block 66 along surface 64, upon loosening screws 71, the height of the tool, i.e. its distance to the right from slide 55 in FIG. 8, can be varied; and by adjustment of key 57 along T-slot 56, when screws 58 and 59 are loosened, the tool may be adjusted longitudinally of the slide. When screws 59 are loosened (and with screws 58 tightened if desired), the guide 62 may also be adjusted along tongue 60 of key 57, to adjust the tool, laterally in FIGS. 7 and 9, relative to slide 55. These three adjustments are preferably made with the aid of micrometer gages, not shown, in accordance with calculated tool settings.

The tooth cutting stroke of slide 55 is upwardly as viewed in FIGS. 7 and 8. Due to the inclination of seating block surface 67 and the relative inclinations of top face 19 and cutting edges 12, 13 of the tool, a clearance angle A is provided back of the tip cutting edge of the tool, and there is a smaller but ample clearance angle back of edges 12 and 13. By reason of inclination of back and front faces 67 and 68 of the tool at angle B to a plane perpendicular to the cutting direction, the cutting edges 12, 13 are given end rake in addition to side rake, which has been found to further improve their cutting action. In the illustrated embodiments these angles A and B are respectively eight and ten degrees.

Referring especially to FIG. 9, one side of a tooth of gear G is cut by a tool 10, 15, mounted in a tool holder including seating block 66 carried by slide 55, while the other side of the tooth is cut by a similar tool 110, 115, of opposite hand. Tool 110, 115, is mounted in holder of opposite hand, having a tool seating block 166, carried by the other tool slide, 155. When finish cutting gears from the solid, the finishing cuts are taken by side cutting edges 12 and 112, and the edges 13 and 113 are so positioned, relatively, that they leave the desired amount of stock on the teeth for removal by edges 12 and 112. However in the case of tools designed for rough cutting only, all of the cuttings edges 12, 13, 112, 113 are relatively positioned to leave stock for a subsequent finish cutting operation. In such rough cutting, if desired each indexing of the work gear may be by two teeth.

Figure 10:
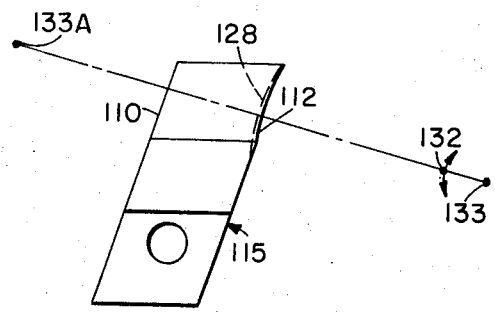
FIGS. 10 and 11 are respectively side and front views of a tool with modified sharpening.
Figure 11:
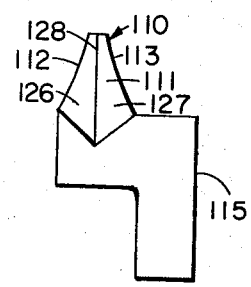

FIGS. 10 and 11 illustrate a tool like that shown in FIG. 1 but of opposite hand and having its front face 111 sharpened concavely, as for example by a grinding wheel dressed with conical surfaces 52, 53, like the wheel shown in FIG. 4, but having its axis 132 oscillated as indicated by the arrow in FIG. 10 about a parallel axis, 133, instead of having a relatively reciprocating motion to the tool. Accordingly the angularly related sections 126 and 127 of face 111 are formed as conical surfaces, and their intersection is a circular arc 128. The result is that the side cutting edges 112 and 113 are curved in cutting profile, as shown, exaggerated, in FIG. 11. This mode of sharpening may be used for modifying the profile shape of the gear teeth, for example for increasing their profile curvature. It will be understood, however, that other profile modifications may readily be made. For example if the axis of wheel oscillation is placed at 133A in FIG. 10, instead of at 133, convex side cutting edges will be provided on the tool instead of the concave edges 112, 113.

The tool 200 shown in FIGS. 12 and 13 is relatively longer and hence has longer cutting life than the tool shown in FIG. 1. Moreover it may be sharpened at either end, so that the tools for cutting opposite tooth sides may be alike except for sharpening. After the tools have been used and sharpened back through approximately half of their lengths, i.e. about as far as the tool shown in FIG. 13 has been sharpened back from its original condition, shown in broken lines, they may be sharpened on their opposite ends and reversed in the tool holders of the gear cutting machine. The tool 200 may be sharpened with a cutting or sharpening face 201 of trough form with two acute side cutting edges 202, 203, as shown in FIG. 12, or with a conventional plane cutting face 204 with only one acute side cutting edge 205 and an obtuse opposite side edge 206, as shown in FIG. 13, this mode of sharpening being conventional for the finish cutting of gears whose tooth slots have been roughed out in a preceding operation. Or it may be sharpened with a conventional plane cutting face and with the edges 205 and 206 of equal angularity.

The trough of cutting face 201 may have a rounded or radiused bottom 207, as shown, or it may have a more sharply angled bottom, as shown at 28 in FIG. 1. Such rounding, to the extent that it may be possible in view of the point width of a particular tool, strengthens the tool and reduces the possibility of breakage at its tip. Of course the front face trough of the tool shown in FIG. 1 may also have such a rounded bottom, if desired.

Like the tool of FIGS. 1 and 2, the tool 200 is of generally prismatic form and comprises a cutting portion 208, which may be regarded as the portion to the left of plane 209 in FIG. 16, and a shank portion 211 to the right of plane 209. The prism lateral faces of the cutting portion are designated 212–215 and those of the shank portion 216–218. All of these prism faces are perpendicular to the plane 16—16, as is also the plane 209. The faces of the shank which seat on the tool holders are designated 217 and 218. They are relatively inclined at an acute angle, somewhat greater than seventy degrees in the illustrated embodiment, face 218 being approximately perpendicular to plane 209 and approximately parallel to face 213 which constitutes the tip face of the cutting portion. Side faces 212 and 214 of the cutting portion are oppositely inclined relative to plane 209. Sharpening of the cutting face is effected by motion of the sharpening tool in the direction of trough bottom 207 which is parallel to plane 209 and at least approximately bisects the angle between side faces 212, 214.

Face 215 is inclined to plane 209, and preferably is parallel to face 217. This inclination of face 215 helps to avoid interference between the oppositely stroking tools, which reciprocate in relatively inclined paths corresponding to the tooth thickness taper of the gear being cut. Referring to FIG. 13, the corner 219 of the tool nearest the cone apex of the gear being cut and located at the intersection of faces 215, 218 and shank front end face 221, is most subject to such interference, and this corner is offset from the path of the other tool by the inclination of face 215.

The tool holder for mounting tool 200 on slide 55 of the machine includes a tool block 226 and a tool block key 227 adjustably secured to the slide by means of headed screws 228 and 229 threaded into holding strap 231 in T-slot 56 of the slide. These screws, and also a screw 232 which clamps strap 231 to the slide, are loosened to enable adjustment of the tool block, the key and the strap longitudinally of the slot. The key 227 has a tongue 233 fitting into the T-slot and has another tongue, 234, fitting into a groove in block 226, the latter groove being transverse of the T-slot and guiding the block and tool for lateral adjustment, horizontally in FIG. 14, upon loosening of screws 228, 229. Screw 232 holds the strap, key and block against longitudinal movement while such lateral adjustment is being made.

The tool block 226 has a wedge guide groove whose bottom face 235 is parallel to tool face 218, perpendicular to plane 209 and inclined at tool clearance angle A to the face plane 236 of tool slide 55 which is at least approximately parallel to the tool stroking direction. The side face 237 of the wedge guide groove is perpendicular to face 235 and inclined to plane 209, i.e. to the tool stroking direction, at a very small angle, C in FIG. 14, the inclination being on the order of 1:30. Seated in this guide groove is a tool angle adjusting wedge 238 of approximately L-shape in cross-section, the stem of the L having parallel plane faces which respectively seat on surfaces 218 and 235 and the leg of the L having inclined faces for seating on surfaces 237 and 217. This leg of the L is tapered longitudinally, i.e. as viewed in FIG. 14, also by the angle C. The portion of tool face 217 that is remote from the portion thereof which seats on the wedge 238, bears on face 239 of the tool block 226. Hence, by adjusting the wedge longitudinally, i.e. vertically in FIG. 14, to thereby move laterally in FIG. 16 the vertical leg of the L-shaped wedge, the tool may be slightly tipped on the surface 239 to thereby adjust the inclination of the cutting edges of the tool. The wedge is provided with graduations 241 to facilitate such adjustment. This mode of adjustment is substantially in accord with Patent No. 1,587,709 of S. H. Earl.

Each tool is secured to its block 226 by headed screws 242 which extend perpendicularly to plane 209 through elongated slots 243 in the block and are threaded into tapped holes 244 in the tool shank 211. A collar 245, which spaces the screw heads from the tool, is slightly tapered as shown in FIG. 14, by about one degree, so that impact forces against the tool, tending to drive it and the collar downwardly in FIG. 14, tend to tighten the screws. The surface of the block 226 which seats the collar has a complementary inclination of about one degree to plane 209. A screw 246 threaded into the tool block bears against and serves to secure the wedge 238.

Having now described the improved gear cutting tools, the manner of their use and modes of sharpening them, what I claim as my invention is:

1. A gear cutting tool of prismatic form, of the kind which (a) has cutting edges at the junctures of prism lateral faces thereof with a sharpening face that is transverse of said lateral faces, and which (b) is resharpenable by removal of layers of stock from the sharpening face and without removing stock from the prism lateral faces, said tool comprising a cutting portion and a shank portion disposed on opposite sides of and connected together along a juncture plane which is parallel to the prism lateral edges of the tool, said cutting portion having adjoining tip and opposite side prism lateral faces which respectively contain tip and opposite side cutting edges, said opposite side prism lateral faces being inclined to each other at an acute angle whose bisector plane is substantially parallel to said juncture plane, the sharpening face of said cutting portion being of trough form, with the bottom of the trough disposed substantially in said bisector plane, so that both of said side cutting edges are acute, said shank portion having at least one prism lateral face for seating on a tool holder of a gear cutting machine and being adapted to support said cutting portion rigidly on the tool holder, and said sharpening face terminating at said juncture plane whereby the tool is resharpenable by the removal of successive trough shaped layers of stock from said sharpening face while leaving said shank portion substantially intact.

2. A tool according to claim 1 in which said shank portion has at least one screw threaded opening extending therethrough, transversely of said juncture plane, for connection with a screw for securing the tool to such tool holder.

3. A tool according to claim 2 in which the shank portion has two relatively inclined prism lateral faces for seating upon the tool holder, and has a plurality of such screw threaded openings spaced therealong with their axes substantially perpendicular to said juncture plane and lying in a plane substantially parallel to said prism lateral edges.

4. A tool according to claim 1, in which said sharpening face comprises two angularly related sections which form a trough between said side cutting edges, with the intersection of said sections forming the bottom of the trough disposed in said bisector plane.

5. A tool according to claim 1 in which the bottom of the trough is substantially straight in said bisector plane.

6. A tool according to claim 1 in which the bottom of the trough is substantially curved in said bisector plane.

7. The method of sharpening a gear cutting tool of prismatic form, of the kind which (a) has cutting edges at the juncture of prism lateral faces thereof with a sharpening face that is transverse of said lateral faces, and which (b) is resharpenable by removal of layers of stock from the sharpening face and without removing stock from the prism lateral faces, said tool having a cutting portion and a shank portion disposed on opposite sides of and connected along a juncture plane which is parallel to the prism lateral edges of the tool, said cutting portion having adjoining tip and opposite side prism lateral faces, said side prism lateral faces being inclined to each other at an acute angle whose bisector plane is substantially parallel to said juncture plane, said method comprising the formation of a trough shaped sharpening face transverse of the prism lateral faces of said cutting portion by means of a sharpening tool having a working profile complementary to the profile of the trough of the sharpening face, by movement of such tool in said bisector plane in the direction of the bottom of the trough.

8. The method of claim 7 carried out with a sharpening tool comprising a rotating grinding wheel positioned with its rotation axis substantially perpendicular to said bisector plane, with an end face thereof disposed substantially in said juncture plane so that the wheel does not act on said shank portion of the tool, with the active periphery of said wheel complementary in profile shape to the trough form to which the sharpening face is to be shaped, and with the portion of said active periphery which is of maximum diameter being disposed substantially in said bisector plane.

9. The method of claim 8 in which during the formation of said sharpening face by grinding wheel the latter is traversed across said face in a direction parallel to said juncture plane.

10. The method of claim 9 in which such traversal across said face is rectilinear.

11. A tool according to claim 17 in which said sharpening face is of trough shape, with the bottom of the trough lying in said bisecting plane, and both of said oppositely inclined side edges are acute tooth side cutting edges.

12. The method of sharpening a gear cutting tool whose cutting face is of trough form and has relatively inclined opposite side cutting edges and a tip cutting edge, which comprises removing stock from said face with a sharpening tool having adjoining oppositely tapering conical surfaces, the sharpening tool during the stock removal operation being so positioned that the circle of intersection of said surface lies in a plane which approximately bisects the angle between said side cutting edges.

13. The method of claim 12 in which during the stock removal there is a relative motion of the gear cutting tool and the sharpening tool in said plane which traverses said conical surfaces across said cutting face.

14. The method of claim 13 in which said relative motion in said plane is rectilinear.

15. The method of claim 13 in which said relative motion in said plane is curvilinear.

16. The method of claim 15 in which the curved path of relative motion is such as to concavely curve said cutting face in said plane.

17. A gear cutting tool of generally prismatic form having a cutting portion of which one end constitutes the sharpening face of the tool, said sharpening face having a tip cutting edge and relatively inclined opposite side edges at least one of which is a tooth side cutting edge, and an integral shank portion for securement to a tool holder, said shank portion being offset from the cutting portion to permit sharpening of said cutting face by relative motion of a a sharpening tool approximately in a plane which bisects the angle between the prism faces containing said side edges, without cutting away said shank portion, said shank portion having, for seating on the tool holder, a first prism face which is substantially parallel to the prism face containing said tip cutting edge and a second prism face inclined to the first at an acute angle, and said tool having a prism face substantially parallel to said second face and adjacent to the prism face containing one of said side edges.

18. A tool according to claim 17 in which said acute angle is on the order of seventy degrees.

19. A tool according to claim 17 having a plurality of parallel screw holes spaced therealong, the axes of said screw holes being approximately perpendicular to said plane and lying in a plane substantially parallel to said first prism face.

References Cited
UNITED STATES PATENTS

| | | | |
|---|---|---|---|
| 717,601 | 1/1903 | Normand | 29—96 |
| 744,228 | 11/1903 | Peele | 29—96 |
| 1,415,237 | 5/1922 | Guttly | 29—96 |
| 1,991,494 | 2/1935 | Dempsey | 29—96 |
| 2,550,949 | 5/1951 | Weidner | 29—96 |

HARRISON L. HINSON, *Primary Examiner.*